(12) United States Patent
Agnitch et al.

(10) Patent No.: US 10,060,513 B2
(45) Date of Patent: *Aug. 28, 2018

(54) OVERRUNNING ALTERNATOR DECOUPLING PULLEY DESIGN

(71) Applicant: MOTORCAR PARTS OF AMERICA, INC., Torrance, CA (US)

(72) Inventors: John G. Agnitch, Rolling Hills Estates, CA (US); Nelson Meza, Lynwood, CA (US)

(73) Assignee: MOTORCAR PARTS OF AMERICA, INC., Torrance, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/382,505

(22) Filed: Dec. 16, 2016

(65) Prior Publication Data

US 2017/0097068 A1 Apr. 6, 2017

Related U.S. Application Data

(63) Continuation of application No. 14/207,316, filed on Mar. 12, 2014, now Pat. No. 9,599,200.

(51) Int. Cl.
*F16H 7/08* (2006.01)
*F16H 55/36* (2006.01)
*F16D 41/064* (2006.01)
*F16F 15/121* (2006.01)

(52) U.S. Cl.
CPC ......... *F16H 7/0827* (2013.01); *F16D 41/064* (2013.01); *F16F 15/1216* (2013.01); *F16H 55/36* (2013.01); *F16H 2055/366* (2013.01)

(58) Field of Classification Search
CPC .. F16H 7/0827; F16H 55/36; F16H 2055/366; F16F 15/1216; F16D 41/064
USPC ........................................................ 474/94
See application file for complete search history.

(56) References Cited

U.S. PATENT DOCUMENTS

| 7,998,008 | B2* | 8/2011 | Kamdem | F16D 41/206 474/161 |
|---|---|---|---|---|
| 9,599,200 | B2* | 3/2017 | Agnitch | F16H 7/18 |
| 2010/0101909 | A1* | 4/2010 | Dell | F16D 41/206 192/43 |
| 2012/0295746 | A1* | 11/2012 | Cali | F16D 3/02 474/94 |
| 2015/0285365 | A1* | 10/2015 | Canto Michelotti | F16H 55/36 474/94 |
| 2016/0047427 | A1* | 2/2016 | Ward | F16H 55/36 192/55.5 |

* cited by examiner

*Primary Examiner* — William E Dondero
*Assistant Examiner* — Mark K Buse
(74) *Attorney, Agent, or Firm* — Pillsbury Winthrop Shaw Pittman LLP

(57) ABSTRACT

A pulley assembly for an automobile auxiliary apparatus, such as an alternator, that dampens torsional impacts and reduces the stress on the auxiliary apparatus, the belt drive system and other apparatuses, by use of both a torsion spring and a one-way overrunning clutch mechanism allowing for the free run of the pulley shaft.

20 Claims, 7 Drawing Sheets

OVERRUNNING ALTERNATOR DECOUPLING PULLEY DESIGN

CROSS REFERENCE TO RELATED APPLICATIONS

This application is a continuation application of U.S. application Ser. No. 14/207,316, filed Mar. 12, 2014 which is incorporated herein by reference in its entirety.

FIELD OF INVENTION

The invention relates generally to a pulley for an auxiliary apparatus of a vehicle engine which allows for the transfer of rotational energy to the auxiliary apparatus through a drive belt system while both reducing harmful torsional impact events on the auxiliary apparatus, and allowing for the free overrun of the auxiliary apparatus when the vehicle engine makes sudden negative changes in speed.

BACKGROUND OF THE INVENTION

Most auxiliary apparatuses of a motor vehicle engine—such as the alternator, the power steering pump and the air conditioner compressor shaft—are driven by a serpentine belt connected to a pulley on the crankshaft of an engine. The belt, in turn, drives pulleys on the auxiliary apparatuses.

It is well-known that the serpentine drive belt on a multi-cylinder engine seldom transmits constant torque to the various accessories which it drives. As the pistons sequentially fire, there are sudden torsional impact forces transmitted through the belt to the auxiliary apparatuses. A driven apparatus, such as an alternator, may have significant rotational inertia resisting changes to its rotational velocity, which can cause stress on the serpentine belt and other apparatuses in the belt system.

The prior art discloses the use of a one-way overrunning clutch for a driven pulley. The one-way clutch operates such that it only transmits torque in one rotational direction. However, while such a design allows an auxiliary apparatus to spin freely when the engine makes sudden negative changes in speed—such as when a down-shift occurs or when the engine is turned off—the use of a one-way clutch alone does not address the torsional impacts that occur due to the sequential firing of pistons in a multi-cylinder engine, or other reasons.

The prior art further discloses the use of devices within a pulley assembly to dampen or reduce the effect of harmful torsional impacts in a belt driven system. However, such prior art does not adequately address the situation described above, where a sudden reduction in the speed of the engine occurs. In such a situation, while the damping devices may absorb some of the torsional impact, the significant rotational inertia of an auxiliary apparatus, such as an alternator, will cause a tremendous amount of stress on the belt and on other engine accessories and apparatuses, potentially reducing the lives of such parts.

Further, the manner in which the devices in the prior art attempt to reduce the effect of harmful torsional impacts is not as effective as that disclosed in the present invention.

SUMMARY OF THE INVENTION

According to an embodiment of the invention, a pulley assembly comprises an inner shaft with a damping element concentrically coupled to, and disposed about, the inner shaft. An embodiment of the invention further comprises a one-way overrunning clutch disposed between the inner shaft and damping element, the one-way overrunning clutch being configured so as to permit torque to be transferred from the inner rotating element to the inner shaft, and to substantially prevent the transfer of torque from the inner shaft to the inner rotating element. In a further embodiment of the invention, an outer pulley housing is disposed about, and spaced from, the damping element, such that minimal to no friction exists between the damping element and the outer pulley housing, the top end of a helical torsion spring is matingly coupled to the damping element and the bottom end of the torsion spring is matingly coupled to the outer pulley housing, whereby torsional impacts to the pulley assembly are substantially reduced.

DETAILED DESCRIPTION

The invention relates generally to a decoupling pulley for an alternator which allows for the transfer of rotational energy to the alternator while isolating harmful torsional impact events inherent in belt systems driven by piston-driven engines. Torsional impacts occur in such belt systems due, in part, to the sequential firing of pistons in piston-driven engines. The invention utilizes a torsion spring which flexes, or winds and un-winds, during such torsional impacts, thereby slowing the accelerative effect on the rotor of the alternator and reducing the stress on the serpentine belt and other components in the belt system.

In addition, alternators have significant rotational inertia which may cause significant stress to the belt, and to other auxiliary apparatuses connected to the belt system, when the engine driving the alternator suddenly slows down. Such stress may shorten the lives of both the belt and other auxiliary apparatuses. The invention incorporates dual ball-bearings and a one-way overrunning clutch, e.g. a sprag clutch, which allows the alternator rotor to spin freely when the engine makes sudden negative changes in speed, such as when a down-shift occurs or the engine is turned off. The invention thereby reduces stress not only to the driven auxiliary apparatus, but to the drive belt and other apparatuses connected to the belt drive system as well.

Figure 1:
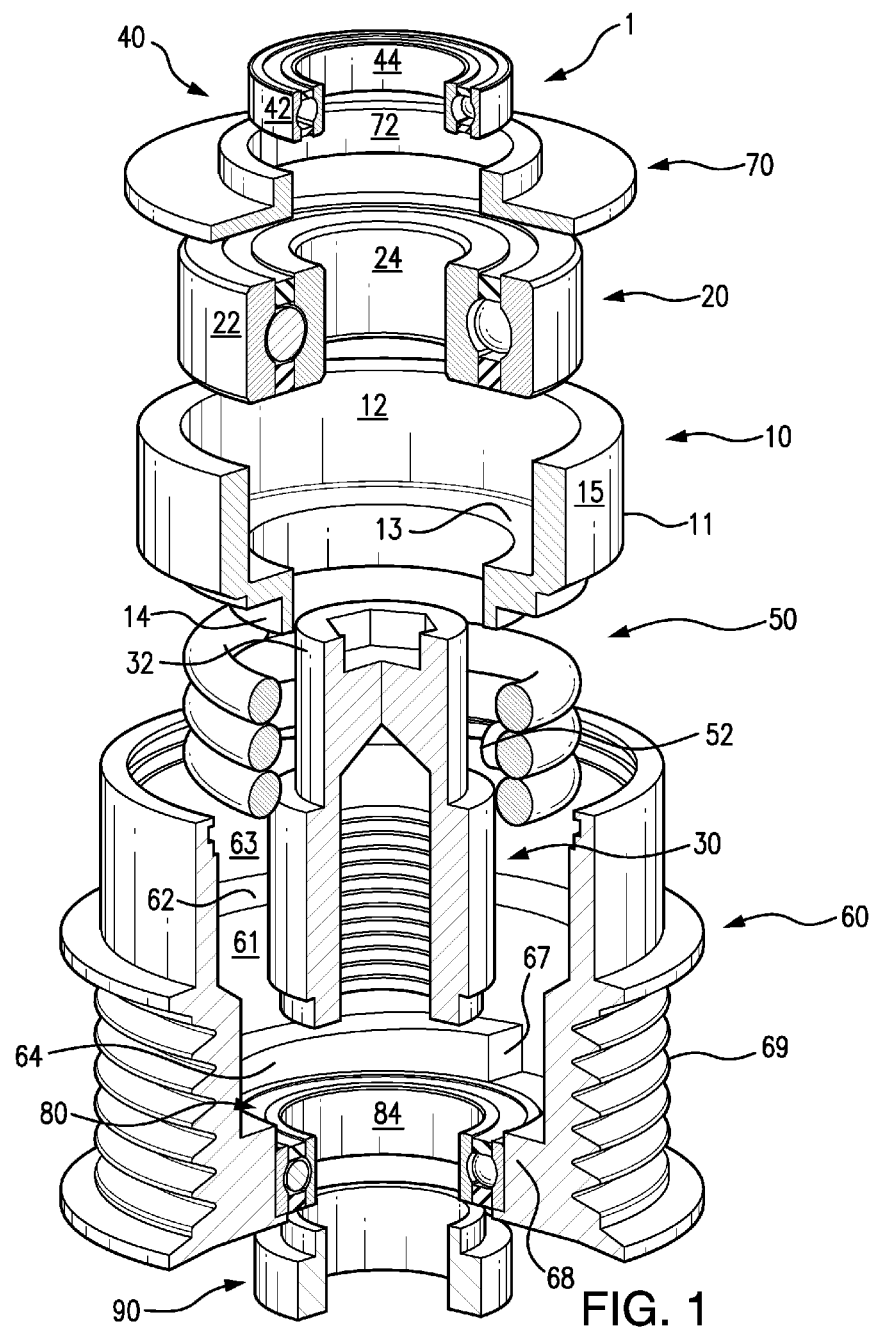
FIG. 1 shows an exploded view of an overrunning alternator decoupling pulley in accordance with an embodiment of the invention.
Figure 3:
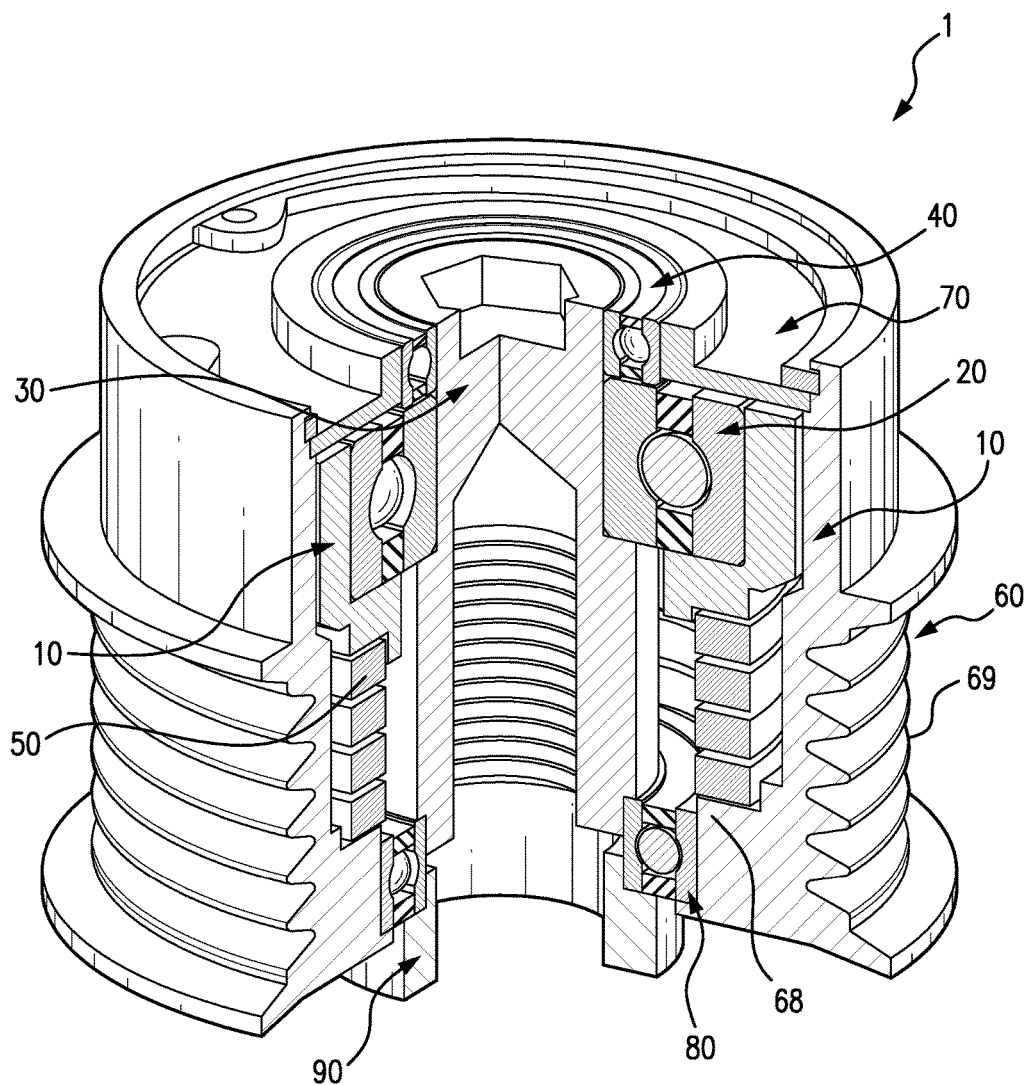
FIG. 3 shows a sectional, isometric view of an overrunning alternator decoupling pulley in accordance with an embodiment of the invention.
Figure 4:
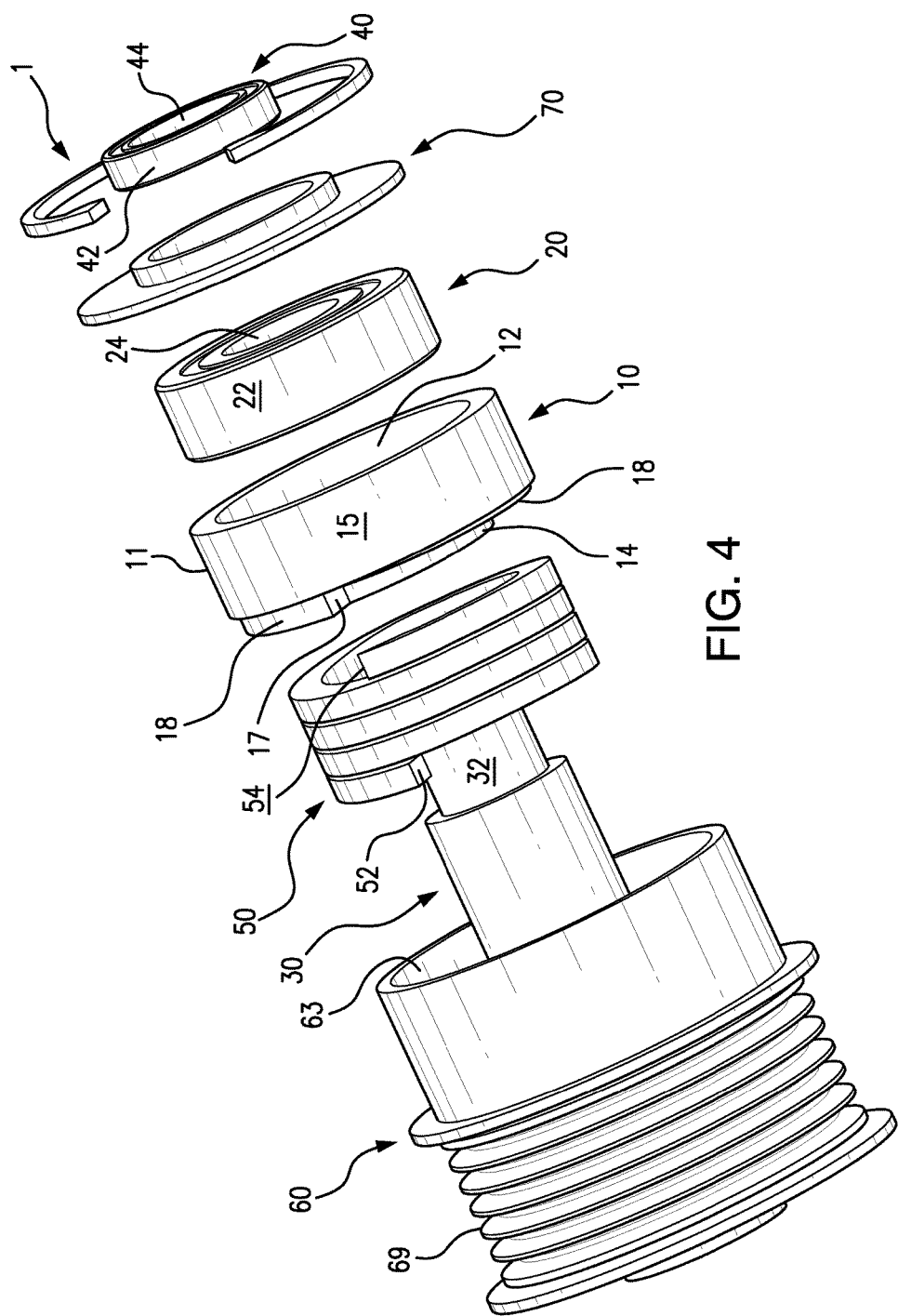
FIG. 4 shows an exploded view of an overrunning alternator decoupling pulley in accordance with an embodiment of the invention.
Figure 5:
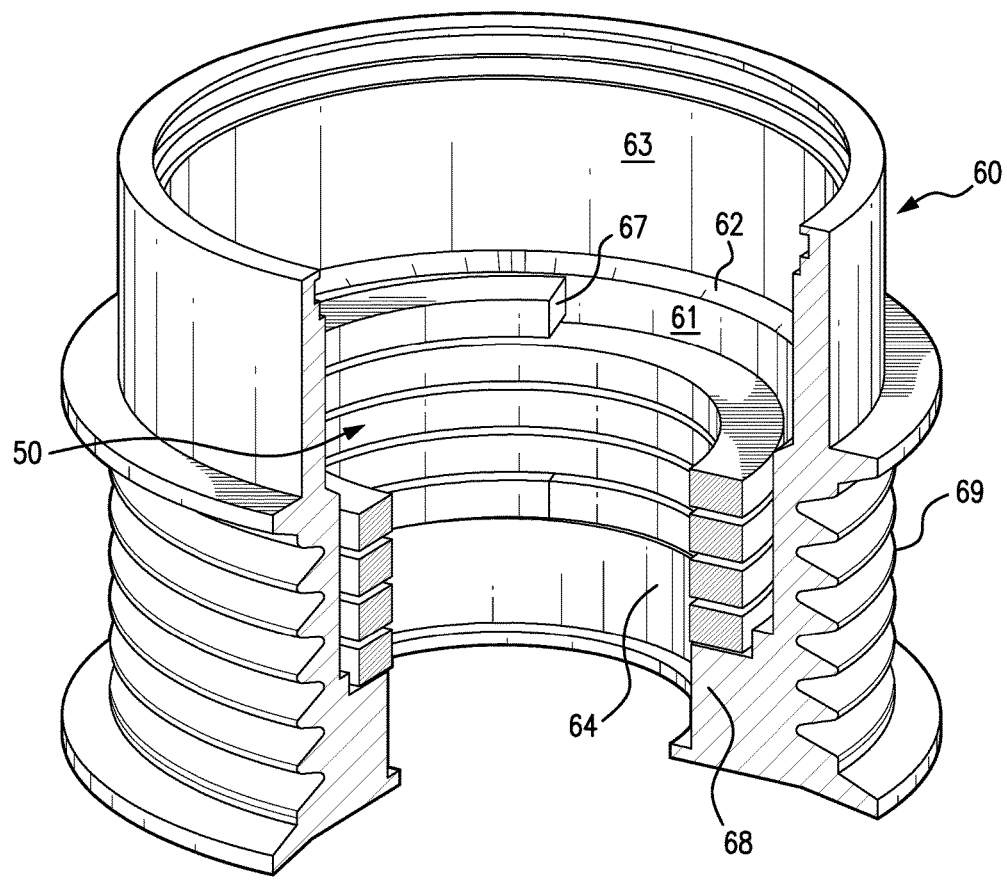
FIG. 5 shows a sectional, isometric view of an overrunning alternator decoupling pulley in accordance with an embodiment of the invention.

FIGS. 1 and 4 show a pulley assembly 1, including an inner shaft 30, a one-way overrunning clutch 20, a damping element 10, a torsion spring 50, and an outer pulley housing 60. The one-way overrunning clutch 20, damping element 10, torsion spring 50, and outer pulley housing 60 are all concentrically configured and selectively rotatable around the longitudinal axis of the inner shaft 30. The outer pulley housing 60 has a substantially tubular shape with openings at a top end and a bottom end, as shown in FIGS. 1 and 5. It should be appreciated that the terms "top" and "bottom" are used for descriptive purposes only and not by way of limitation. As shown in FIGS. 1-5, the outer pulley housing 60 includes an outer periphery having groves 69 which are adapted to engage a serpentine drive belt (serpentine belt not shown). The serpentine drive belt is typically driven by a driving apparatus (i.e. an engine) and drives an auxiliary apparatus (i.e. an alternator) via a pulley apparatus, such as the pulley assembly 1 disclosed in the present invention.

As shown in FIGS. 1 and 5, in a preferred embodiment, the outer pulley housing 60 includes an inner curved surface having four separate portions: a first inner surface portion 63 towards the top of the outer pulley housing 60 having a first radius; a second inner surface portion 61 having a second radius smaller than the first radius; a third inner surface portion 62 joining the first 63 and second 61 inner surface portions; and a fourth annular portion 68 at the bottom of the outer pulley housing 60 just below the second inner portion 61 and having a third radius smaller than the second radius. In a preferred embodiment, a first helical ramp member 64 begins on top of the fourth annular portion 68 and spirals upward along the second inner surface portion 61 of the outer pulley housing 60. In an embodiment of the invention, the first helical ramp member 64 has an inner radius that is substantially the same as the third radius of the fourth annular portion 68 of the outer pulley housing 60. In a preferred embodiment, the top end 67 of the helical ramp member 64 is configured to matingly abut a bottom end 52 of the torsion spring 50. Such a configuration allows torque that is transferred from the serpentine belt to the outer pulley housing 60 to be transferred to the torsion spring 50 via the top end 67 of the first helical ramp member 64 which abuts the bottom end 52 of the torsion spring 50.

It should be appreciated that the portions of the outer pulley housing 60 and the first helical ramp member 64 may be integral and machined out of a singular block of material. The invention encompasses to use of any rib or protrusion from the inner surface of the outer pulley housing 60 that is configured to abut, and transfer torque to, the bottom end 52 of the torsion spring 50. However, a ramp having the same or substantially similar helical profile as the torsion spring 50 is preferred as it provides the torsion spring 50 with additional support and stability.

Figure 6:
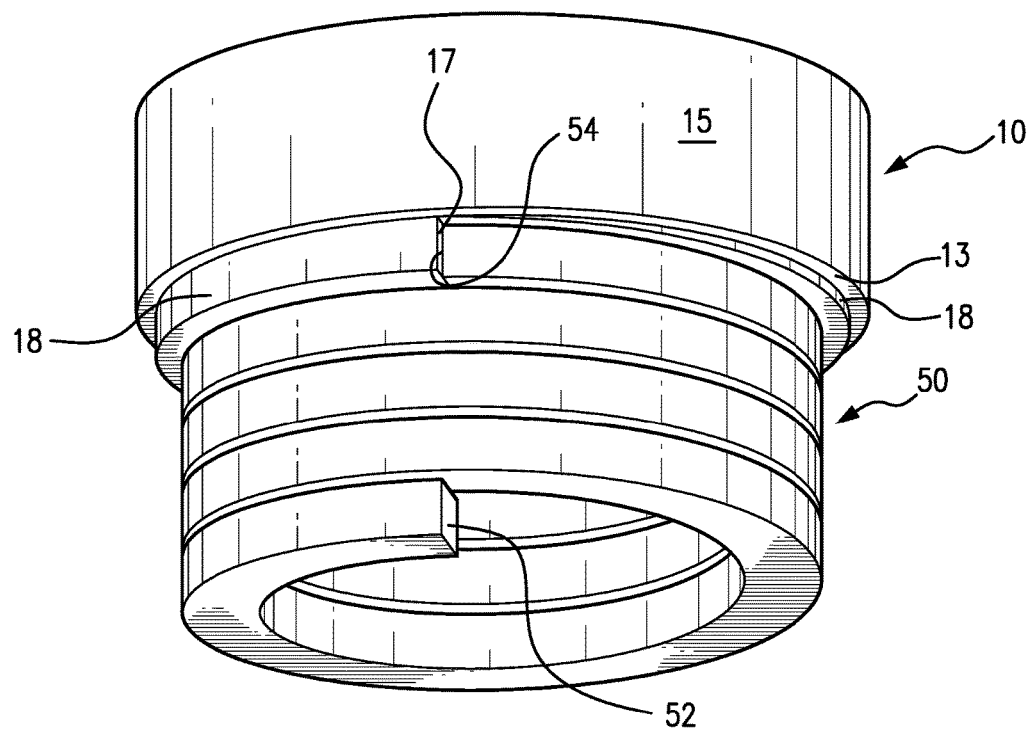
FIG. 6 shows an outer pulley housing member and a torsion spring in accordance with an embodiment of the invention.

In a preferred embodiment, the damping element 10 of the pulley assembly 1 (see FIGS. 1, 4, and 6) includes three portions: a tubular top portion 11 having an inner surface 12 of a fourth radius, a tubular bottom portion 14 having an inner surface of a fifth radius smaller than the fourth radius, and an annulus member 13 attaching the top portion 11 to the bottom portion 14, the annulus member 13 having a top surface and bottom surface. In an embodiment of the invention, the annulus member 13 has an inner radius substantially the same as the inner radius of the bottom portion 14. In a further embodiment of the invention, as shown in FIGS. 4 and 6, a second helical ramp member 18 spirals downward from the bottom surface of the annulus member 13, mirroring the upward spiraling first helical ramp member 64 described above. In a preferred embodiment, the damping element 10 sits within a cavity defined by inner curved surface of the outer pulley housing 60, specifically within a cavity defined, in part, by the first inner surface portion 63 and the third inner surface portion 62. As described more fully below, in a preferred embodiment of the invention, the tubular top portion 11 of damping element 10 has an outer surface 15 which rotates relative to, but does not touch, the first inner surface portion 63 of the outer pulley housing 60 during operation of the invention.

In a preferred embodiment, the bottom end 17 of the second helical ramp member 18 is configured to matingly abut the top portion 54 of torsion spring 50. Such configuration allows torque to be transferred from the torsion spring 50 to the damping element 10 via the top portion 54 of the torsion spring 50 which abuts the bottom end 17 of the second helical ramp member 18.

It should be appreciated that, similar to the outer pulley housing 60 described above, the portions of the damping element 10 and the second helical ramp member 18 may be integral and machined out of a singular block of material.

In a preferred embodiment, the torsion spring 50 is configured to flex during torsional impacts transmitted to the pulley assembly 1 from a driving engine via a drive belt. Such torsional impacts result in the sudden acceleration or deceleration of the outer pulley housing 60 and may be caused by the sequential firing of pistons in piston-driven engines. The torsion spring 50 slows the accelerative effect of the torsional impacts on an apparatus driven by the pulley assembly 1 and reduces the stress on the serpentine belt and other components in the belt system. In various embodiments of the invention, the torsion spring 50 may be of a circular cross-section (as shown in FIGS. 1 and 2), a square-cross section (as shown in FIGS. 3-6) or any other shape.

It should be appreciated that, unlike pulley assembly configurations disclosed in the prior art, the torsion spring 50 of the present invention is not in frictional engagement with any portion of the pulley assembly 1 and does not act as a clutch mechanism. That is, the torsion spring 50 in the present invention does not unwind or expand to a point where it comes into contact with any portion of inner surface 61, 62, 63 the outer pulley housing 60. In the prior art, springs used as clutch mechanisms are generally configured such that the spring unwinds as the inner shaft of the pulley assembly rotates faster than the outer pulley housing driven by the serpentine drive belt. In the present invention, the opposite occurs: the torsion spring 50 returns to its normal resting position as the inner shaft 10 rotates faster than the outer pulley housing 60. As described more fully below, the torsion spring 50 is meant to dampen the vibrations transferred to the pulley assembly 1 from the engine via the serpentine drive belt, not to act as a clutch mechanism.

In a preferred embodiment of the invention, the top portion 11 of damping element 10 contains a substantially cylindrical cavity having a periphery defined in part by the inner surface 12 of the top portion 11 of the damping element 10 and the top surface of the annulus member 13 of the damping element 10. The cylindrical cavity contains, in a preferred embodiment, a one-way overrunning clutch 20 (e.g. a sprag clutch) which sits within the top portion 11 of the damping element 10. In a preferred embodiment, the one-way overrunning clutch 20 is concentrically configured and selectively rotatable around the longitudinal axis of the inner shaft 30, the one-way overrunning clutch 20 having an inner surface 24 configured to mate directly with, and rotate in one direction with respect to, an outer surface 32 of the inner shaft 30. In addition, in an embodiment of the invention, the one-way overrunning clutch 20 has an outer surface that is press fit with the inner surface of the top portion 11 of the damping element 10, such that an outer surface of the one-way overrunning clutch 20 and the inner surface 12 of the damping element 10 do not rotate in relation to one another. Such configuration allows the damping element 10 to drive the inner shaft 30 when the damping element 10 rotates faster than the inner shaft 30, and allows the inner shaft 30 to disengage from, and rotate freely with respect to, the damping element 10 when the damping element 10 rotates slower than the inner shaft 30.

Figure 2:
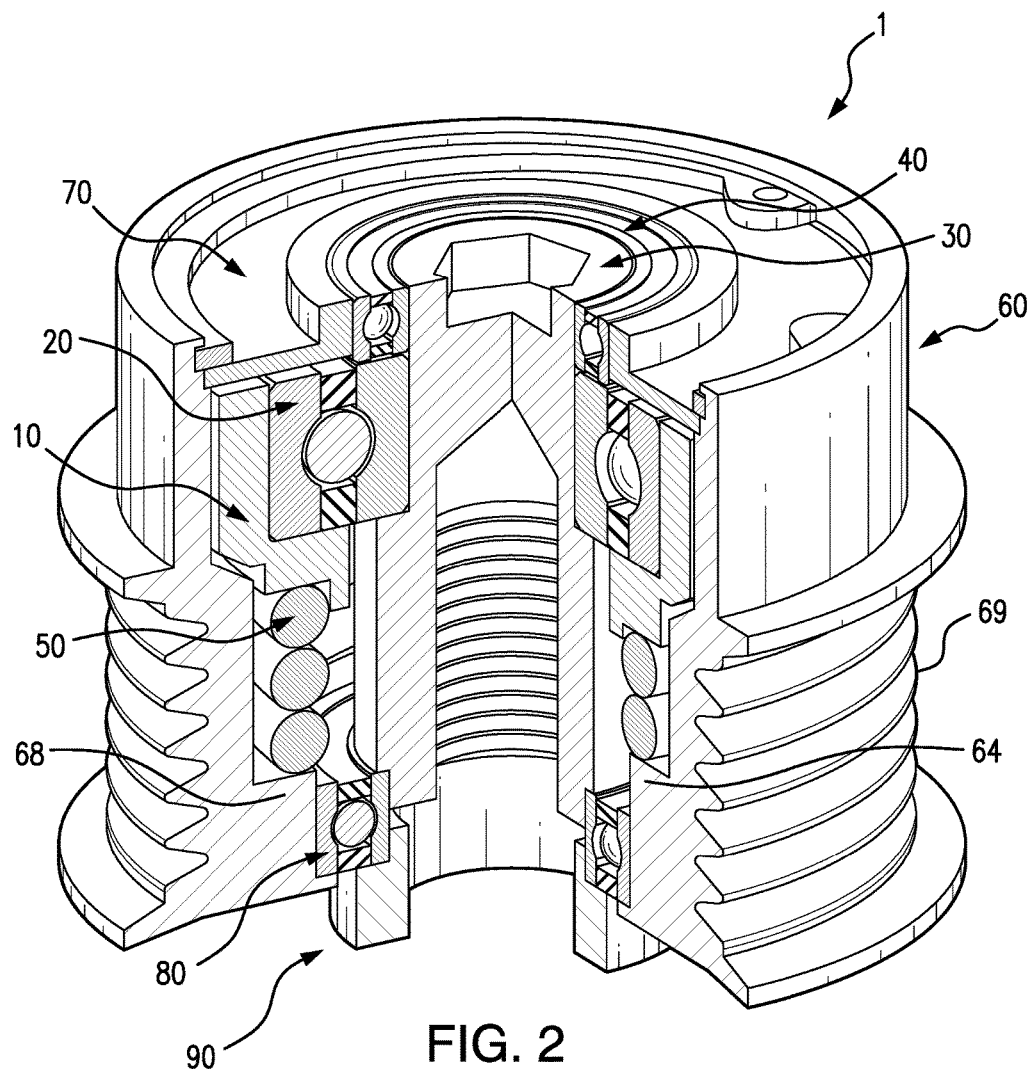
FIG. 2 shows a sectional, isometric view of an overrunning alternator decoupling pulley in accordance with an embodiment of the invention.

FIGS. 1 and 2 further show two ball bearings 40, 80, which, in conjunction with the one-way overrunning clutch 20, allow for the inner shaft 30 to rotate freely when the rotational velocity of the damping element 10 is less than the rotational velocity of the inner shaft 30. In a preferred embodiment, the one-way overrunning clutch 20 and ball bearings 40, 80 are concentrically configured around the longitudinal axis of the inner shaft 30. A first ball bearing 40, having an outer surface 42 and inner surface 44, may be disposed at a top end of the outer pulley housing 60. The first ball bearing 40 may be configured so its outer surface 42 mates with an inner surface 72 of an end cap 70. The end cap 70 supports the first ball bearing 40 and offers protection to the pulley assembly 1 from outside contaminants. The first ball bearing may also be configured so its inner surface 44 rotatably mates with the inner shaft 30 or an axle of an auxiliary apparatus driven by the pulley assembly 1.

A second ball bearing 80 may be disposed at the bottom end of the outer pulley housing 60 and configured so its outer surface 42 mates with an inner surface of the fourth annular portion 68 of the outer pulley housing 60. The second ball bearing 40 may also be configured so its inner radial surface 44 rotatably mates with the inner shaft 30 or the axle of an auxiliary apparatus being driven by the pulley assembly 1. The first and second ball bearings 40, 80 may be needle roller bearings, and may be press fit with the end cap 70 and outer pulley housing 60, respectively.

In an embodiment of the invention, the bottom of the pulley assembly 1 further includes a spacer 90 which keeps the inner shaft 30 and the auxiliary apparatus driven by the pulley assembly 1 (e.g. an alternator) at an appropriate length for the pulley assembly 1 to function effectively.

In a preferred embodiment of the invention, when the components of the pulley assembly 1 are assembled together, the outer surface 15 of damping element 10 is spaced from the inner surface 63 of outer pulley housing 60 such that minimal to no friction exists between the outer surface 15 of damping element 10 and the inner surface 63 of outer pulley housing 60. In an embodiment of the invention, the damping element 10 only mates with outer pulley housing 60 via torsion spring 50, which abuts the bottom end 17 of the second helical ramp member 18 of the damping element 10 and the top end 67 of the first helical ramp member 64 of the inner surface of outer pulley housing 60. It should be appreciated that although the outer surface 15 of damping element 10 is spaced from the inner surface 63 of outer pulley housing 60 according to an embodiment of the invention, it is possible that a substance, such as a lubricant, on the inner surface 63 of outer pulley housing 60 or the outer surface 15 of damping element 10 may fill the space between the two surfaces. Even in such a case, however, very minimal friction will exist between the outer surface 15 of damping element 10 and the inner surface 63 of outer pulley housing 60.

According to an embodiment of the invention, the damping element 10 may be lubricated on its outer surface Further, in preferred embodiment, the outer pulley housing only mates with the inner shaft 30 via (1) the second ball bearing 80, which allows the inner shaft 30 to rotate independently from the outer pulley housing 60, and (2) the torsion spring 50, which, as just described, mates with damping element 10, which mates with one-way overrunning clutch 20, which mates with the inner shaft 30.

An illustrative example of the operation of an embodiment of the invention follows. For the purposes of this example, initially all components are in their resting positions, including torsion spring 50. As the outer pulley housing 60 receives torque from a car engine via the serpentine drive belt, it transfers the torque to the torsion spring 50 via the first helical ramp member 64 of the outer pulley housing 60, the end 67 of which abuts the bottom end 52 of the torsion spring 50. At this time the torsion spring 50 unwinds a certain amount, the amount of flexure being dependent on the characteristics of the spring, after which the torsion spring 50 transfers torque to the damping element 10. In a preferred embodiment, the torque is transferred from the torsion spring 50 to the damping element 10 via the top end 54 of the torsion spring 50, which abuts the second helical ramp member 18 attached to damping element 10. As explained above, in a preferred embodiment, the damping element contains a one-way overrunning clutch 20, such as a sprag clutch, which is preferably press fit into the top portion 11 of the damping element 10. The one-way overrunning clutch 10 transfers torque from the damping element 10 to the inner shaft 30, which is directly fixed to, and provides the torque necessary to rotate, the rotor of the auxiliary apparatus (e.g. an alternator). In a preferred embodiment, the inner shaft 30 is supported within the pulley assembly 1 by ball bearings 40, 80.

During the operation of a vehicle, sudden torsional impact forces, such as those caused by firing of pistons in a multi-cylinder engine, may be transmitted from the serpentine drive belt to the outer pulley housing 60 of the pulley assembly 1. The present invention utilizes the torsion spring 50 to absorb these harmful torsional impact forces by allowing the damping element 10 to rotate, in a preferred embodiment, up to approximately 60 degrees relative to the outer pulley housing 60. As stated, it is the flexure of the torsion spring 50 that provides the pulley assembly 1 its vibration damping ability.

According to an embodiment of the invention, when such torsional impact forces cause the outer pulley housing 60 to rotate faster in the drive direction than the inner shaft 30, the torsion spring 50 absorbs such torsion impact forces by unwinding or expanding. On the other hand, when sudden torsional impact forces cause the outer pulley housing 60 to rotate slower than the inner shaft 30, the torsion spring 50 absorbs such torsional impact forces by winding or compressing. If the torsion spring 50 were not present, such sudden torsional impact forces would be directly transmitted from the engine to the apparatus driven by the pulley assembly 1 causing vibration and stress to the apparatus, the drive belt, and other apparatuses connected to the serpentine drive belt system.

Figure 5A:
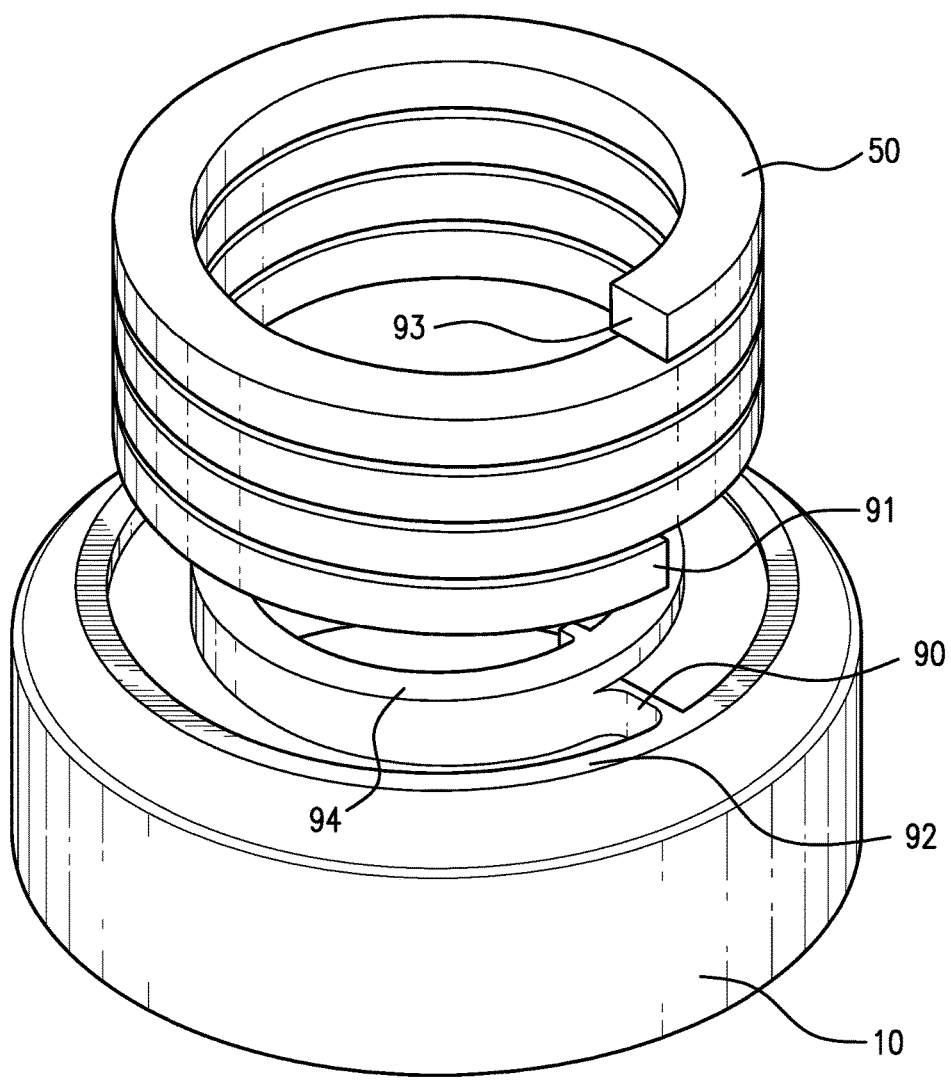
FIG. 5A shows an exploded view of a spring pocket formed by an inner spring retaining wall and an outer spring retaining wall in accordance with an embodiment of the invention.

According to an embodiment of the invention, as the outer pulley housing 60 receives torque from a car engine via a serpentine drive belt, it transfers the torque to the torsion spring 50 via the first helical ramp member of the outer pulley housing 60, the end 67 and 93 of which abuts the bottom end 52 of the torsion spring 50 (see FIGS. 3 and 4). At this time, the torsion spring 50 and transfers torque to the damping element 10. The abutment of the damping element 10 may apply force to the opposite end 91 of the torsion spring 50 and cause it to expand. In embodiments of the invention, if a high level of torque is applied, the opposite end 91 of the torsion spring 50 deforms far enough away from the coils of the spring to dislodge it from the damping element 10 and then contact the outer pulley housing 60. This results in friction between the torsion spring 50 and the outer pulley housing 60 and interferes or reduces the damping capabilities of the invention. FIG. 5A illustrates a spring pocket 90 formed by an inner spring retaining wall 94 and an outer spring retaining wall 92 that is designed to keep the coils of the torsion spring from becoming dislodged. By capturing the top portion 91 (or opposite end) in the spring pocket 90, the torsion spring 50 is able to expand more uniformly and eliminate the possibility of the torsion spring contacting the pulley housing. This embodiment is able to handle higher torque loads and more uniform vibration damping throughout the entire deflection range of the torsion spring.

In an embodiment of the invention, the size and pitch of the helical ramps, both in the pulley housing 60 and the damping element 10, are the same size and pitch as the torsion spring 50. This is true whether the torsion spring 50 has a circular cross-section (as illustrated in FIGS. 1 and 2), a square cross-section (as illustrated in FIGS. 3 to 6), or any other shape. The uniformity of size, pitch and shape, creates a rotational symmetry which helps avoid any dynamic imbalances. The dynamic imbalances could cause undo vibration at high speeds if the ramps have different sizes or pitches than the torsion spring.

Further, under conditions when the engine decelerates suddenly or is turned off, undue stress on the drive belt can be avoided if the rotor for the auxiliary apparatus (e.g. alternator) driven by the pulley assembly 1 is able to slow down at its own rate, or, stated differently, undue stress on the drive belt can be avoided if the inner shaft 30 of the pulley assembly 1 is able to free run when the rotational velocity of the outer pulley housing 60 is less than the rotational velocity of the inner shaft 30. Allowing for the free run of the inner shaft 30 is important because certain auxiliary apparatuses in an automobile, such as an alternator, have significant rotational inertia which will resist changes to their rotational velocity. Such resistance causes stress to and reduces the life of the drive belt and other apparatuses connected to the belt drive system if the apparatus remains engaged to the belt drive system when a sudden negative change in speed occurs by the apparatus driving the belt system, i.e. the engine. By allowing the inner shaft 30 of the pulley assembly 1 to spin freely, the stress to the drive belt and other apparatuses is significantly reduced.

According to an embodiment of the present invention, the free run of the inner shaft 30 is accomplished as follows. As the rotational velocity of the outer pulley housing 60 decreases, the torsion spring 50 begins to unwind until it reaches its normally resting position. At this point, as the rotational velocity of the outer pulley housing 60 continues to decrease, the one-way overrunning clutch 20 disengages from the inner shaft 30 and allows the inner shaft 30 to freewheel. The inner shaft 30 will continue to freewheel until it stops on its own, or until the engine accelerates to the point where the rotational velocity of the outer pulley housing 60 exceeds the rotational velocity of the inner shaft 30.

What is claimed is:

1. A pulley assembly comprising:
 a. an inner shaft;
 b. a damping element coupled to and disposed about the inner shaft;
 c. a one-way overrunning clutch disposed between the inner shaft and the damping element, the one-way overrunning clutch selectively permitting torque to be transferred from the damping element to the inner shaft, and substantially preventing the transfer of torque from the inner shaft to the damping element;
 d. an outer pulley housing disposed about and spaced from the damping element such that minimal to no friction exists between the damping element and the outer pulley housing;
 e. a torsion spring, situated longitudinally along an axis of the inner shaft between the damping element and an inner portion of the outer pulley housing, the spring having a top end adjacent to the damping element and a bottom end adjacent to an interior section of the outer pulley housing, the top end of the torsion spring matingly coupled to the damping element and the bottom end of the torsion spring matingly coupled to the outer pulley housing, whereby torsional impacts to the pulley assembly are substantially reduced;
 f. the damping element and the outer pulley housing include an integral spring pocket for matingly coupling to the torsion spring, the spring pocket having the same or similar helical profile as the torsion spring to prevent the spring from becoming dislodged from the damping element or outer pulley housing; and
 g. the outer pulley housing includes a plurality of inner surface portions, the inner surface portions comprising a first inner surface portion towards a top of the outer pulley housing having a first radius, a second inner surface portion having a second radius smaller than the first radius, a third inner surface portion joining the first and second inner surface portions, and a fourth annual portion at a bottom of the outer pulley housing having a third radius smaller than the second radius.

2. The pulley assembly of claim 1, wherein:
 a. the damping element includes a plurality of portions, the plurality of portions comprising a tubular top portion having an inner surface of a fourth radius, a tubular bottom portions having an inner surface of a fifth radius smaller than the fourth radius, and an annulus member attaching the tubular top portion to the tubular bottom portion;
 b. the annulus member has a top surface and a bottom surface, and an inner radius substantially the same as the fifth radius;
 c. a second helical ramp member begins on the bottom surface of the annulus member and spirals downward along the outer surface of the annulus member ending in a bottom end;
 d. the bottom end of the second helical ramp member matingly abuts the top end of the torsion spring;
 e. the outer pulley housing includes an inner surface, the inner surface comprising the first helical ramp member having a beginning and an end, the end of the first helical ramp member configured to abut the bottom end of the torsion spring; and
 f. the damping element includes an outer surface, the outer surface comprising a second helical ramp member having a beginning and an end, the end of the second helical ramp member configured to abut the top end of the torsion spring.

3. The pulley assembly of claim 1, wherein the torsion spring allows the damping element to rotate up to 60 degrees relative to the outer pulley housing.

4. The pulley assembly of claim 1, wherein the torsion spring has a circular cross-section.

5. The pulley assembly of claim 1, wherein the torsion spring has a square cross-section.

6. The pulley assembly of claim 1, wherein the one-way overrunning clutch utilizes needle roller bearings.

7. The pulley assembly of claim 1, further comprising a plurality of ball bearings allowing the inner shaft to rotate independently from the damping element when the rotational speed of the inner shaft is greater than the rotational speed of the damping element.

8. The pulley assembly of claim 1, wherein the torsion spring unwinds as the rotational speed of the outer pulley housing is greater than, and increases relative to, the rotational speed of the damping element.

9. A pulley assembly comprising:
   a. an inner shaft;
   b. a damping element coupled to and disposed about the inner shaft;
   c. a one-way overrunning clutch disposed between the inner shaft and the damping element, the one-way overrunning clutch selectively permitting torque to be transferred from the damping element to the inner shaft, and substantially preventing the transfer of torque from the inner shaft to the damping element;
   d. an outer pulley housing disposed about and spaced from the damping element such that minimal to no friction exists between the damping element and the outer pulley housing;
   e. a torsion spring, situated longitudinally along an axis of the inner shaft between the damping element and an inner portion of the outer pulley housing, the spring having a top end adjacent to the damping element and a bottom end adjacent to an interior section of the outer pulley housing, the top end of the torsion spring matingly coupled to the damping element and the bottom end of the torsion spring matingly coupled to the outer pulley housing, whereby torsional impacts to the pulley assembly are substantially reduced;
   f. the outer pulley housing includes a plurality of inner surface portions, the inner surface portions comprising a first inner surface portion towards a top of the outer pulley housing having a first radius, a second inner surface portion having a second radius smaller than the first radius, a third inner surface portion joining the first and second inner surface portions, and a fourth annual portion at a bottom of the outer pulley housing having a third radius smaller than the second radius; and
   g. an inner diameter of a portion of the outer pulley housing disposed about the torsion spring is sized to limit the amount the torsion spring may expand such that damage to the torsion spring is avoided when the pulley assembly is subjected to torsional loads that cause the torsion spring to expand.

10. The pulley assembly of claim 9, wherein:
   a. the damping element includes a plurality of portions, the plurality of portions comprising a tubular top portion having an inner surface of a fourth radius, a tubular bottom portions having an inner surface of a fifth radius smaller than the fourth radius, and an annulus member attaching the tubular top portion to the tubular bottom portion;
   b. the annulus member has a top surface and a bottom surface, and an inner radius substantially the same as the fifth radius;
   c. a second helical ramp member begins on the bottom surface of the annulus member and spirals downward along the outer surface of the annulus member ending in a bottom end;
   d. the bottom end of the second helical ramp member matingly abuts the top end of the torsion spring;
   e. the outer pulley housing includes an inner surface, the inner surface comprising the first helical ramp member having a beginning and an end, the end of the first helical ramp member configured to abut the bottom end of the torsion spring; and
   f. the damping element includes an outer surface, the outer surface comprising a second helical ramp member having a beginning and an end, the end of the second helical ramp member configured to abut the top end of the torsion spring.

11. The pulley assembly of claim 9, wherein the torsion spring allows the damping element to rotate up to 30 degrees relative to the outer pulley housing.

12. The pulley assembly of claim 9, wherein the torsion spring allows the damping element to rotate up to 60 degrees relative to the outer pulley housing.

13. The pulley assembly of claim 9, wherein the torsion spring has a circular cross-section.

14. The pulley assembly of claim 9, wherein the torsion spring has a square cross-section.

15. The pulley assembly of claim 9, wherein the one-way overrunning clutch utilizes needle roller bearings.

16. The pulley assembly of claim 9, further comprising a plurality of ball bearings allowing the inner shaft to rotate independently from the damping element when the rotational speed of the inner shaft is greater than the rotational speed of the damping element.

17. The pulley assembly of claim 9, wherein the torsion spring unwinds as the rotational speed of the outer pulley housing is greater than, and increases relative to, the rotational speed of the damping element.

18. A pulley assembly comprising:
   a. an inner shaft;
   b. a damping element coupled to and disposed about the inner shaft;
   c. a one-way overrunning clutch disposed between the inner shaft and the damping element, the one-way overrunning clutch selectively permitting torque to be transferred from the damping element to the inner shaft, and substantially preventing the transfer of torque from the inner shaft to the damping element;
   d. an outer pulley housing disposed about and spaced from the damping element such that minimal to no friction exists between the damping element and the outer pulley housing;
   e. a torsion spring, situated longitudinally along an axis of the inner shaft between the damping element and an inner portion of the outer pulley housing, the spring having a top end adjacent to the damping element and a bottom end adjacent to an interior section of the outer pulley housing, the top end of the torsion spring matingly coupled to the damping element and the bottom end of the torsion spring matingly coupled to the outer pulley housing, whereby torsional impacts to the pulley assembly are substantially reduced;
   f. the damping element and the outer pulley housing include an integral spring pocket for matingly coupling to the torsion spring, the spring pocket having the same or similar helical profile as the torsion spring to prevent the spring from becoming dislodged from the damping element or outer pulley housing;
   g. the outer pulley housing includes a plurality of inner surface portions, the inner surface portions comprising a first inner surface portion towards a top of the outer pulley housing having a first radius, a second inner surface portion having a second radius smaller than the first radius, a third inner surface portion joining the first and second inner surface portions, and a fourth annual portion at a bottom of the outer pulley housing having a third radius smaller than the second radius; and h. an inner diameter of a portion of the outer pulley housing disposed about the torsion spring is sized to limit the amount the torsion spring may expand such that damage to the torsion spring is avoided when the pulley assembly is subjected to torsional loads that may cause the torsion spring to expand.

19. The pulley assembly of claim 18 wherein:

a. the damping element includes a plurality of portions, the plurality of portions comprising a tubular top portion having an inner surface of a fourth radius, a tubular bottom portions having an inner surface of a fifth radius smaller than the fourth radius, and an annulus member attaching the tubular top portion to the tubular bottom portion;

b. the annulus member has a top surface and a bottom surface, and an inner radius substantially the same as the fifth radius;

c. a second helical ramp member begins on the bottom surface of the annulus member and spirals downward along the outer surface of the annulus member ending in a bottom end;

d. the bottom end of the second helical ramp member matingly abuts the top end of the torsion spring;

e. the outer pulley housing includes an inner surface, the inner surface comprising the first helical ramp member having a beginning and an end, the end of the first helical ramp member configured to abut the bottom end of the torsion spring; and f. the damping element includes an outer surface, the outer surface comprising a second helical ramp member having a beginning and an end, the end of the second helical ramp member configured to abut the top end of the torsion spring.

20. The pulley assembly of claim 18, wherein the torsion spring allows the damping element to rotate up to 60 degrees relative to the outer pulley housing.

* * * * *